US005920685A

United States Patent [19]
Romano et al.

[11] Patent Number: 5,920,685
[45] Date of Patent: Jul. 6, 1999

[54] PRINTING MACHINE WITH MERGING/ANNOTATING/SIGNATURIZING CAPABILITY

[75] Inventors: Kenneth D. Romano, Webster; Robert M. Chapin, Rushville; Anthony M. Frumusa, Penfield; Khalid M. Rabb, Fairport; James G. Nargi, Farmington; David L. Salgado, Victor; Daniel A. Mohabir, Walworth, all of N.Y.

[73] Assignee: Xerox Corporation, Stamford, Conn.

[21] Appl. No.: 08/783,783

[22] Filed: Jan. 15, 1997

Related U.S. Application Data

[63] Continuation of application No. 08/315,173, Sep. 29, 1994, abandoned.

[51] Int. Cl.$^6$ .................................................. G06F 15/00
[52] U.S. Cl. ........................................ 395/114; 345/135
[58] Field of Search ............................ 395/101, 106, 395/109, 111, 114, 117, 570, 200.3, 200.31, 200.43; 358/537, 540, 400; 382/284, 272; 345/118, 130, 133, 135, 136, 146, 147, 153, 155; 347/1, 2, 3; 399/1, 2, 6, 31, 82, 85; 355/77, 79, 106, 127

[56] References Cited

U.S. PATENT DOCUMENTS

| | | | |
|---|---|---|---|
| 3,597,071 | 8/1971 | Jones ............................................ | 355/3 |
| 4,322,157 | 3/1982 | Miura et al. ............................. | 395/145 |
| 4,616,336 | 10/1986 | Robertson et al. ...................... | 395/147 |
| 4,639,791 | 1/1987 | Masaki ..................................... | 358/300 |
| 4,668,995 | 5/1987 | Chen et al. .............................. | 382/272 |
| 4,821,107 | 4/1989 | Naito et al. .............................. | 358/256 |
| 4,855,580 | 8/1989 | Van Maanen, Jr. ...................... | 235/440 |
| 4,897,803 | 1/1990 | Calarco et al. .......................... | 364/518 |
| 5,021,892 | 6/1991 | Kita et al. ................................ | 358/468 |
| 5,022,085 | 6/1991 | Cok ......................................... | 382/284 |
| 5,028,992 | 7/1991 | Arai ......................................... | 358/540 |
| 5,047,955 | 9/1991 | Shope et al. ............................. | 364/519 |
| 5,079,625 | 1/1992 | Kitamura et al. ........................ | 358/537 |
| 5,105,283 | 4/1992 | Forest et al. ............................. | 358/401 |
| 5,131,075 | 7/1992 | Wilkes et al. ........................... | 395/105 |
| 5,170,340 | 12/1992 | Prokop et al. ........................... | 364/143 |
| 5,175,633 | 12/1992 | Saito et al. .............................. | 358/406 |
| 5,223,948 | 6/1993 | Sakurai et al. .......................... | 358/404 |
| 5,234,466 | 8/1993 | Morgan et al. .......................... | 395/148 |
| 5,271,065 | 12/1993 | Rourke et al. ........................... | 382/212 |
| 5,276,799 | 1/1994 | Rivshin .................................... | 395/162 |
| 5,301,262 | 4/1994 | Kashiwagi ............................... | 395/117 |
| 5,307,458 | 4/1994 | Freiburg et al. ......................... | 395/162 |
| 5,309,558 | 5/1994 | Rourke et al. ........................... | 395/166 |
| 5,353,393 | 10/1994 | Bennett et al. .......................... | 395/135 |
| 5,373,350 | 12/1994 | Taylor et al. ............................ | 355/202 |
| 5,734,915 | 3/1998 | Roewer ................................... | 707/512 |

FOREIGN PATENT DOCUMENTS 1531401  11/1978  United Kingdom .

OTHER PUBLICATIONS

R. F. Koehler, "Copy Numbering Device", *Xerox Disclosure Journal*, vol. 1, No. 5, p. 89.

"Xerox Network Systems Architecture: General Information Manual," Xerox Corporation, XNSG 068504, Apr. 1985, pp. 101–104.

*Primary Examiner*—Scott Rogers
*Assistant Examiner*—Gabriel I. Garcia
*Attorney, Agent, or Firm*—Gary B. Cohen

[57] ABSTRACT

A printing system, for merging a scanned image with a merge image to produce a composite image, is provided. The printing system includes a memory for storing the merge image, in the form of a first set of image data, and a decompression device for decompressing the first set of image data. The printing system further includes a scanner, for reading a hard-copy page to generate a second set of image data, and a annotate/merge device, the annotate/merge device electronically merging the decompressed first set of image data with the second set of image data to produce the composite image.

9 Claims, 18 Drawing Sheets

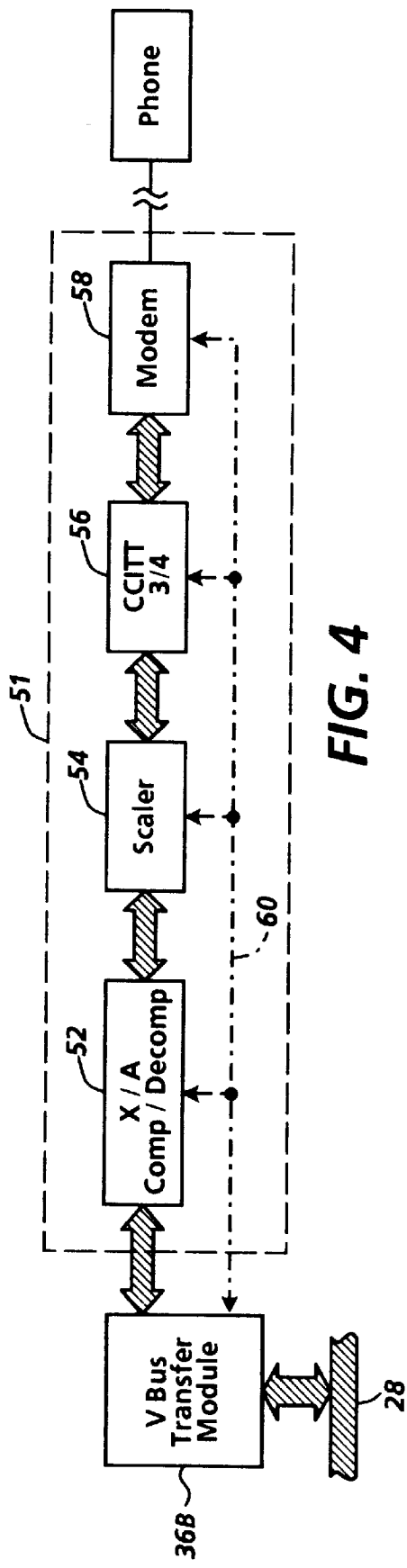
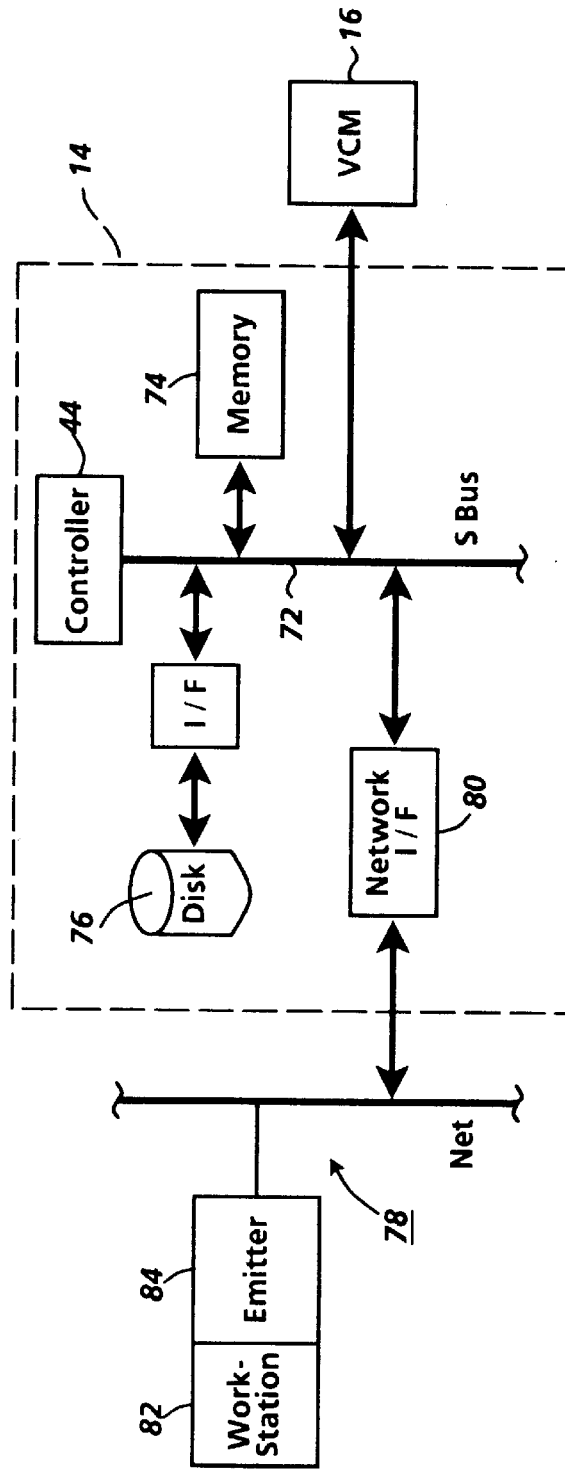
FIG. 4
FIG. 5

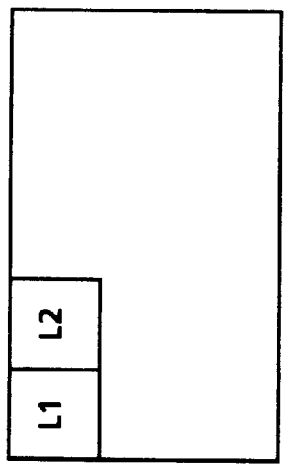
FIG. 14C
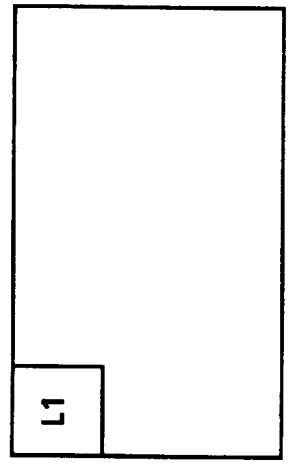
FIG. 14B
FIG. 14A

PRINTING MACHINE WITH MERGING/ANNOTATING/SIGNATURIZING CAPABILITY

This application is a continuation of application Ser. No. 08/315,173, filed Sep. 29, 1994, now abandoned.

The present invention relates generally to a printing technique and, more particularly, to an apparatus and method for merging or annotating a scanned or imported image with a merge image to produce a composite image.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5, 170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device Jobs provided at the IIT may be stored in a memory section, sometimes referred to as "electronic precollation memory. An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458 respectively disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al

Publication Date of Complete Specification: Nov. 8, 1976 British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,30 1,262

Patentee: Kashiwagi

Issued: Apr. 5, 1994

The '262 patent, in contrast to the '401 British patent, compresses image data, prior to storing it in a page buffer, and decompresses the image data, prior to outputting it.

Printing machines have been used to merge one image into another for purposes of printing a composite image on a single substrate. One application in which, for example, numbers are merged onto successive pages of a document is referred to as "annotation". As disclosed in the following reference, annotation can be achieved through optical merging on a light-lenstype copier:

"Copy Numbering Device"

R. F. Koehler

Xerox Disclosure Journal

Vol. 1, No. 5

May, 1976

While optical merging is well suited for its intended purpose, it lacks the flexibility of an electronic merge. An example of an electronic merge operation is disclosed by the following patent:

U.S. Pat. No. 4,897,803

Patentees: Calarco et al.

Issued: Jan. 30, 1990

U.S. Pat. No. 4,897,803 discloses a video manipulation device including a storage register and an image data storage area, for storing image data, respectively, and a data manipulation section. It is believed that merge image data is stored in the image data storage section, and then merged, at the data manipulation section, with image data stored in the storage register.

An example of an electronic merge, performed in a digital printing system is found in the DocuTech® printing system in which image data is scanned, compressed and stored for eventual printing. In one example, the scanned image is shown on a display screen and "laid-out" with a merge image. In turn, the manner in which the scanned image is to be printed with the merge image is designated in a database so that the lay-out work can be accomplished electronically. For efficient storage, the scanned image and the merge image are stored out to disk in compressed form. At print time, the compressed images are decompressed and printed on a single substrate in accordance with the electronic set-up.

The DocuTech approach to merging merge items is well suited for its intended purpose in that a high degree of flexibility is provided and the user is able to program the manner in which s/he intends to perform a merge operation with a high degree of specificity. On the other hand, such merge features are provided at a reasonably substantial cost. Moreover, the significant amount of programming capability provided by the DocuTech is not necessarily required for simple merge operations. It would be desirable to provide a relatively inexpensive, yet efficient merging/annotating technique particularly suited for use in a digital copying apparatus.

Images are merged on a common substrate through the process of "signaturization". More particularly, a plurality of images are stored in memory in one order and then read out of memory in another order for purposes of printing the images on print signature sheets. In one example, two reduced images are imaged on each side of a print media sheet in an "N-Up" or side-by-side manner. Techniques of electronic signaturization are disclosed in the following references:

"Xerox Network Systems Architecture: General Information Manual"

Xerox Corporation

XNSG 068504

Apr., 1985

U.S. Pat. No. 5,105,283

Patentees: Forest et al.

Issued: Apr., 1992

U.S. Pat. No. 5,271,065

Patentees: Rourke et al.

Issued: Dec. 14, 1993

Another approach to printing multiple images on a common substrate, referred to as "set addressing" or "set labeling", is disclosed in the following patent:

U.S. Pat. No. 5,309,558

Patentees: Rourke et al.

Issued: May 3, 1994

The process of printing multiple images on a common substrate, with an electronic printer, is achieved, commonly, at an image output device where images are selected, to be imaged in designated locations of print media, by use of appropriate software. This approach, while well suited for its intended purpose, requires a dedicated software implementation and considerable processing capability. It would be desirable to provide a merging/annotating device that uses a simple, centralized arrangement to perform both merging/annotating and signaturization.

The pertinent portions of all of the above-discussed references are incorporated herein by reference.

In accordance with one aspect of the disclosed embodiment there is provided a printing system for merging a scanned image with a merge image to produce a composite image, a copy of the composite image being reproducible on a print media sheet with a print engine, comprising: a memory for storing the merge image, the merge image being in compressed form and represented by a first set of image data; a decompression device, communicating with said memory, for decompressing the first set of image data; a scanner for reading a hardcopy page to generate a second set of image data representative of a scanned image; and a annotate/merge device, communicating with both the scanner and the decompression device, for receiving both the decompressed first set of image data and the second set of image data, the annotate/merge device electronically merging the decompressed first set of image data with the second set of image data to produce the composite image.

In accordance with another aspect of the disclosed embodiment there is provided a printing system for electronically combining a first image with a second image on a common substrate to form a composite image, a copy of the composite image being reproducible on a print media sheet with a print engine, comprising: a memory for storing the first image in compressed form, the first image being represented by a first set of image data; a decompression device, communicating with the memory, for decompressing the first set of image data; an input source for providing the second image in the form of a second set of image data; and a plural mode image manipulation device, communicating with both the input source and the decompression device, for receiving both the decompressed first set of image data and the second set of image data, the first image being merged with the second image, in a first mode, to form the composite image, and the first image being separated from the second image, in a second mode, to from the composite image.

In accordance with yet another aspect of the disclosed embodiment there is provided a printing system for merging a main image with a merge image to produce a composite image, a copy of the composite image being reproducible on a print media sheet with a print engine, comprising: a memory for storing the merge image, the merge image being in compressed form and represented by a first set of image data; a decompression device, communicating with the memory, for decompressing the first set of image data; an input source for providing the main image in the form of a second set of image data; an image processing section, communicating with the input source, for performing one or more selected image processing operations on the second image; and a annotate/merge device, communicating with both the image processing section and the decompression device, for receiving both the decompressed first set of image data and the image processed second set of image data, the annotate/merge device electronically merging the decompressed first set of image data and the image processed second set of image data to produce the composite image.

These and other aspects of the invention will become apparent from the following description, the description being used to illustrate a preferred embodiment of the invention when read in conjunction with the accompanying drawings.

FIG. 4 is a block diagram of a facsimile card used in conjunction with the printing machine of FIG. 2;

FIG. 5 is a block diagram of a network controller for the printing machine of FIG. 1;

Figure 9:
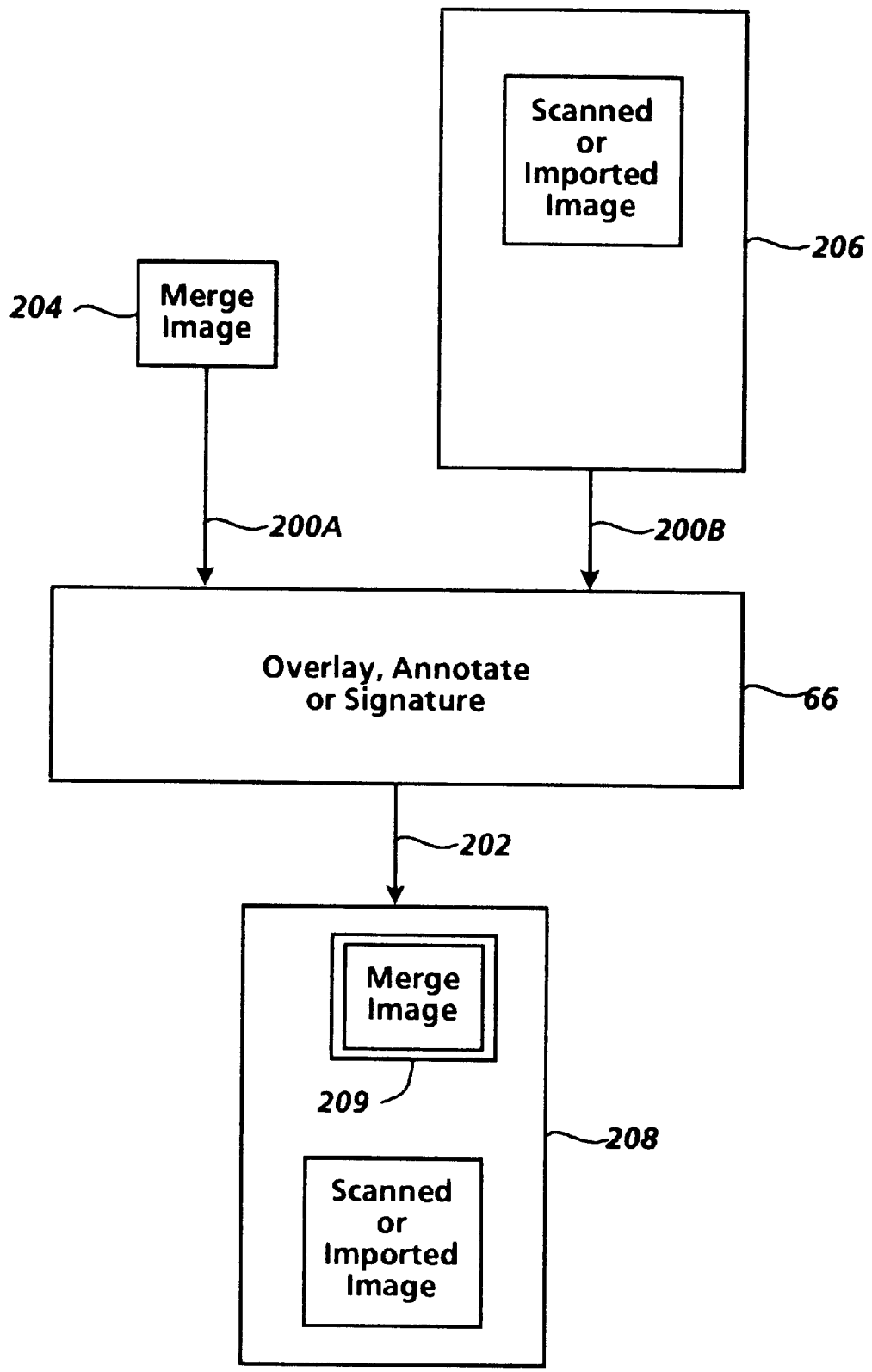
FIG. 9 is a block diagram schematically illustrating a technique for merging an annotation image with a scanned/imported image.

FIG. 14(A)–14(C) is a schematic representation of multiple merge items being merged on a common substrate in accordance with the annotation technique of the present invention;

FIGS. 15–20 are schematic, block diagramatic representations of the annotate/merge device of FIG. 9 in which various modes of operation are illustrated.

While the present invention will hereinafter be described in connection with a preferred embodiment thereof, it will be understood that it is not intended to limit the invention to that embodiment On the contrary, it is intended to cover all alternatives, modifications and equivalents as may be included within the spirit and scope of the invention as defined by the appended claims.

Figure 1:
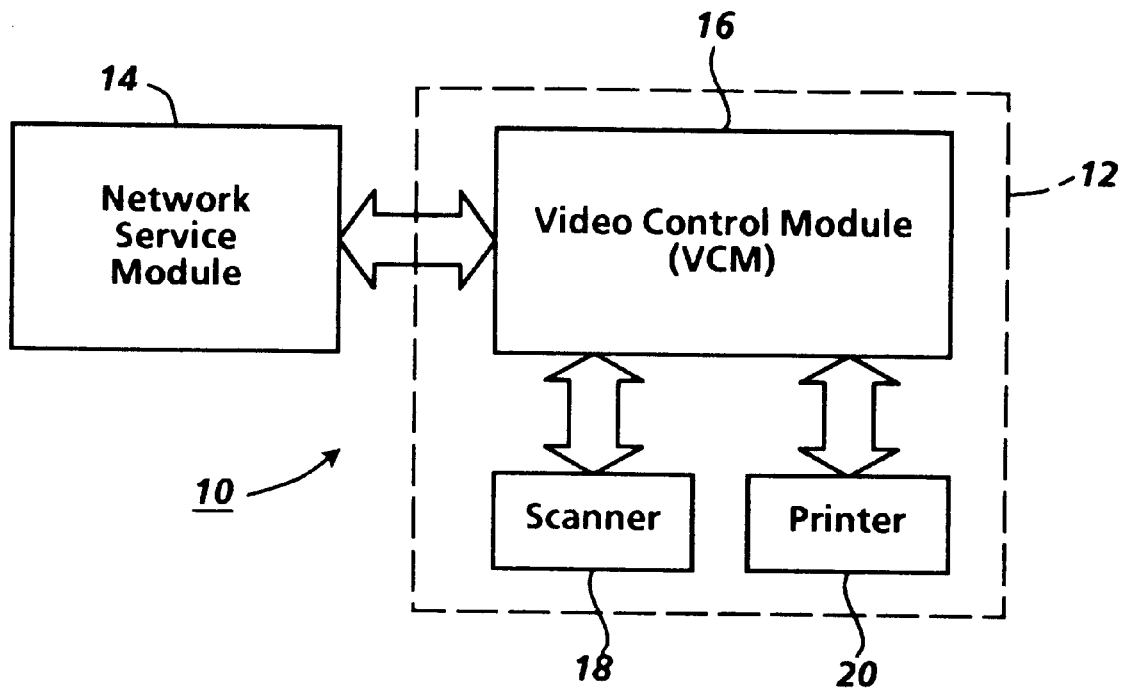
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image inputterminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
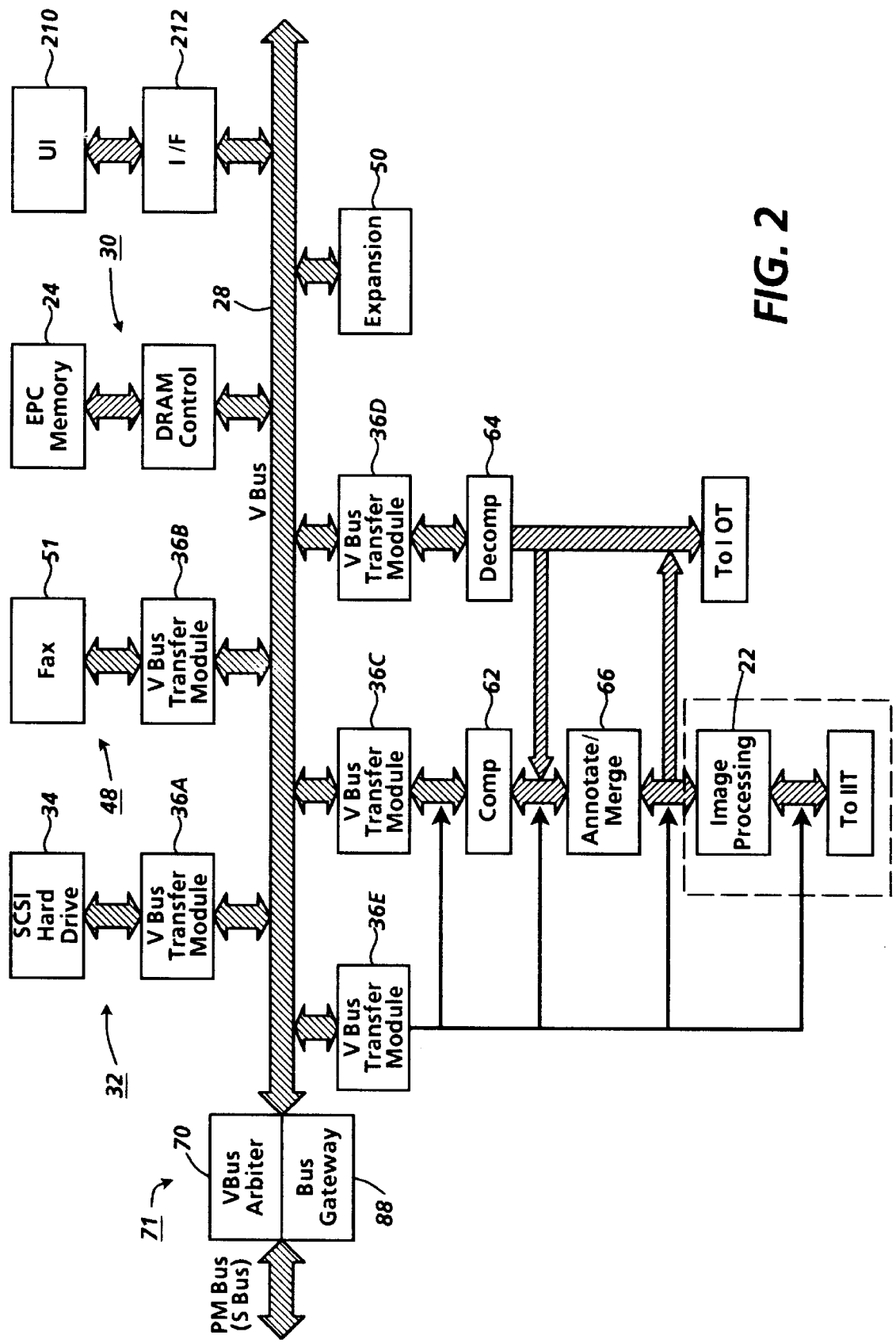
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
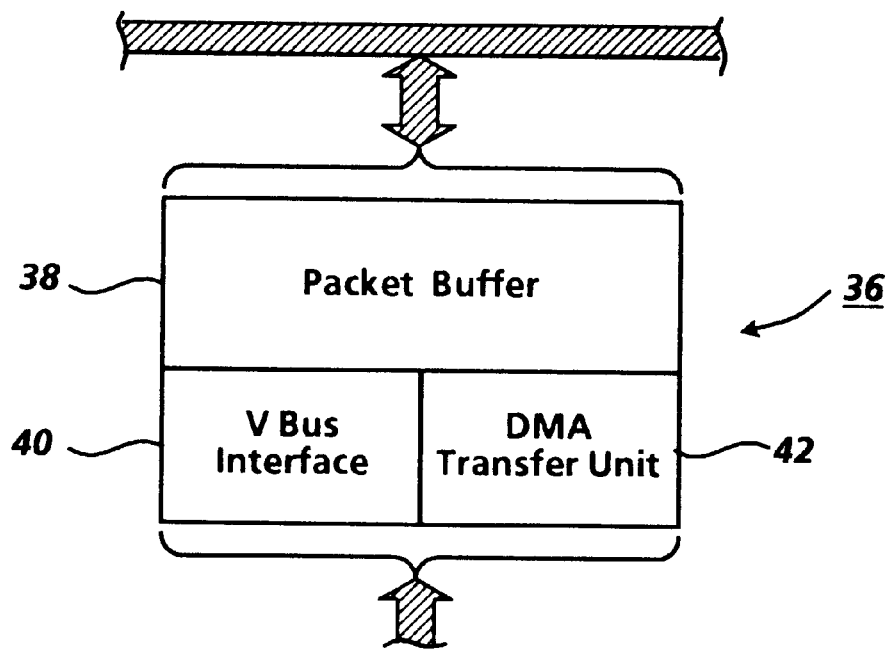
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42 . The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1900

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Figure 19:
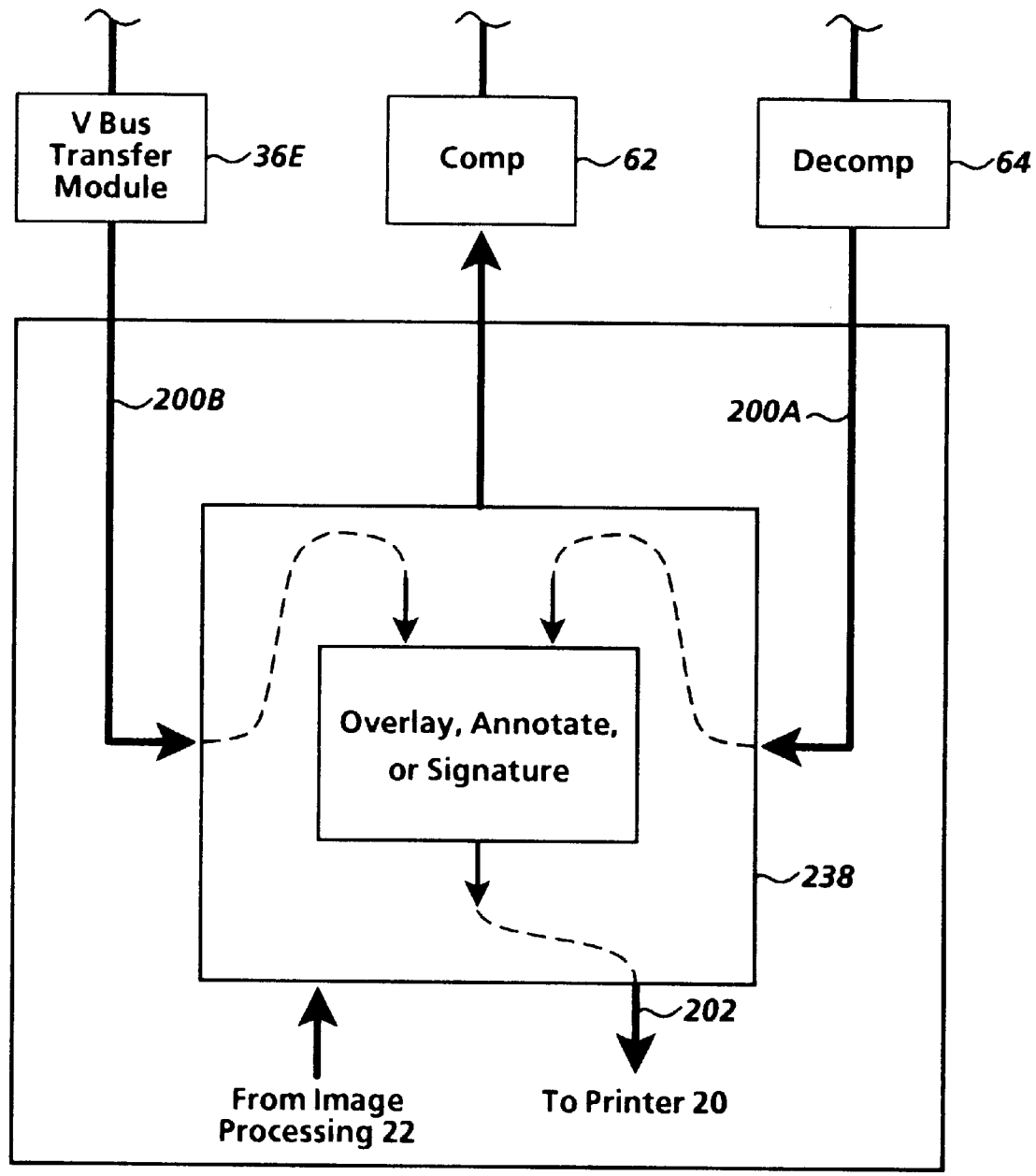
Figure 20:
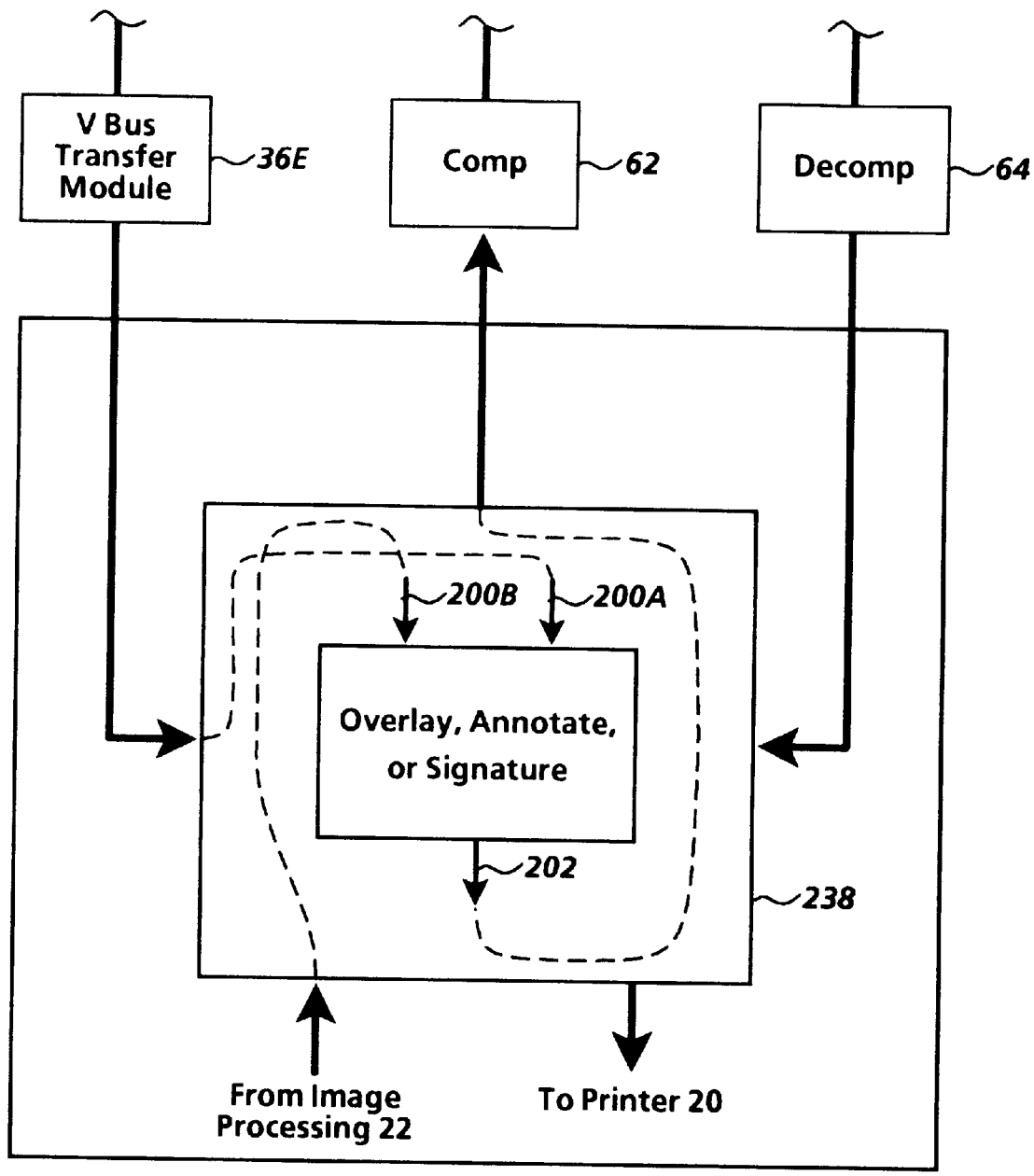

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5-7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74 In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
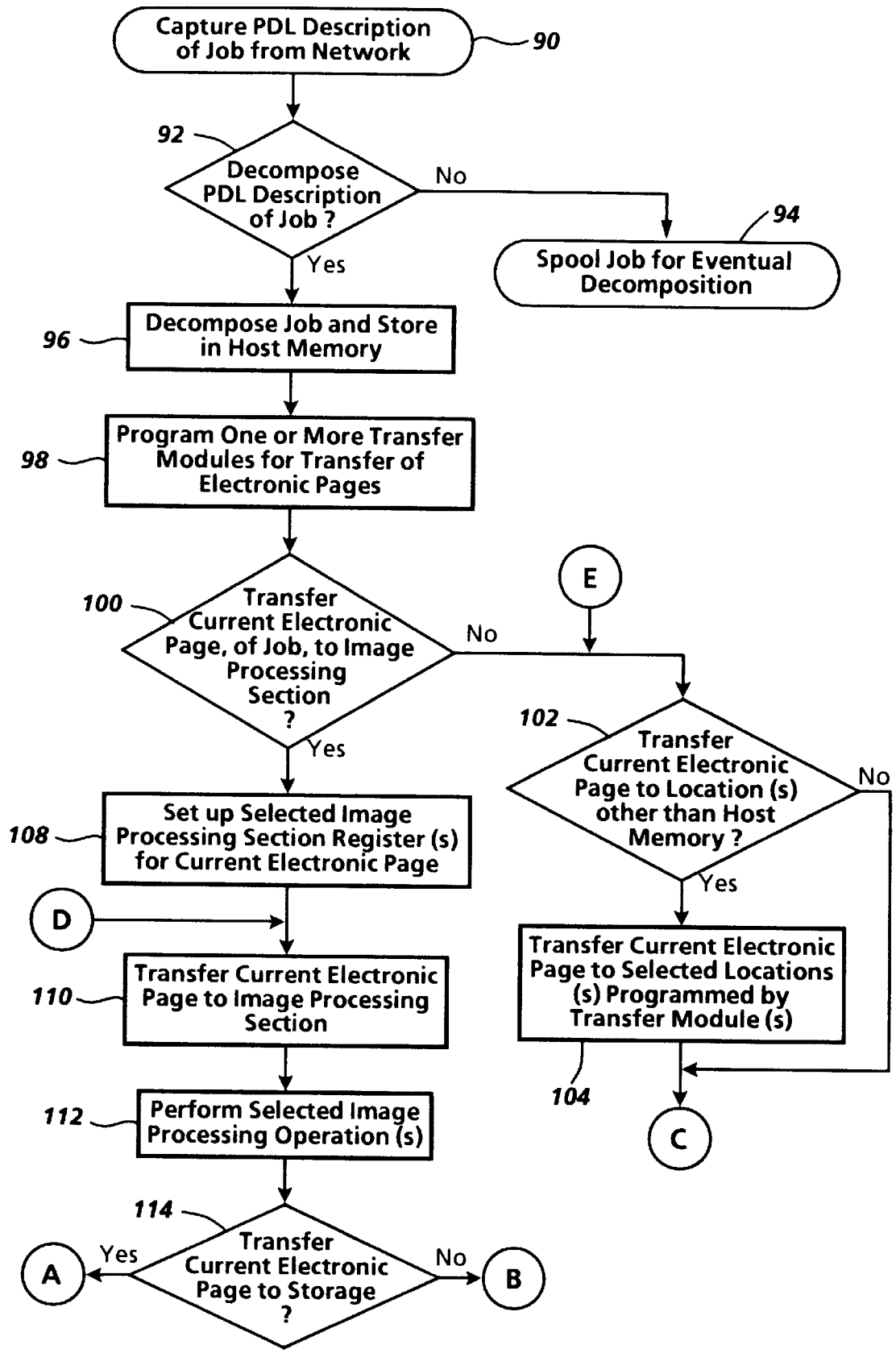
FIGS. 6 and 7 represent a flow diagram for a loopback image processing method of the present invention.
Figure 7:
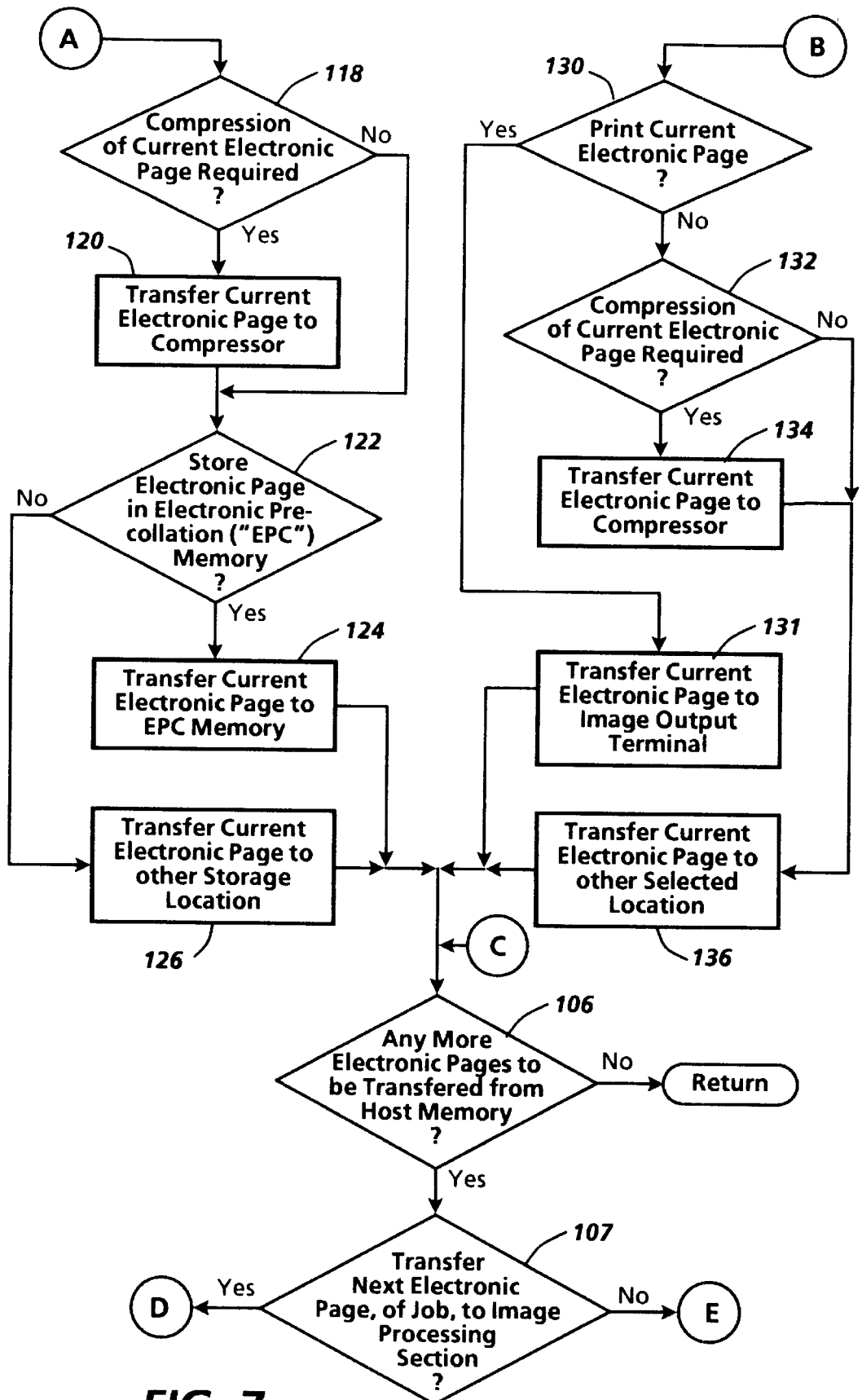

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
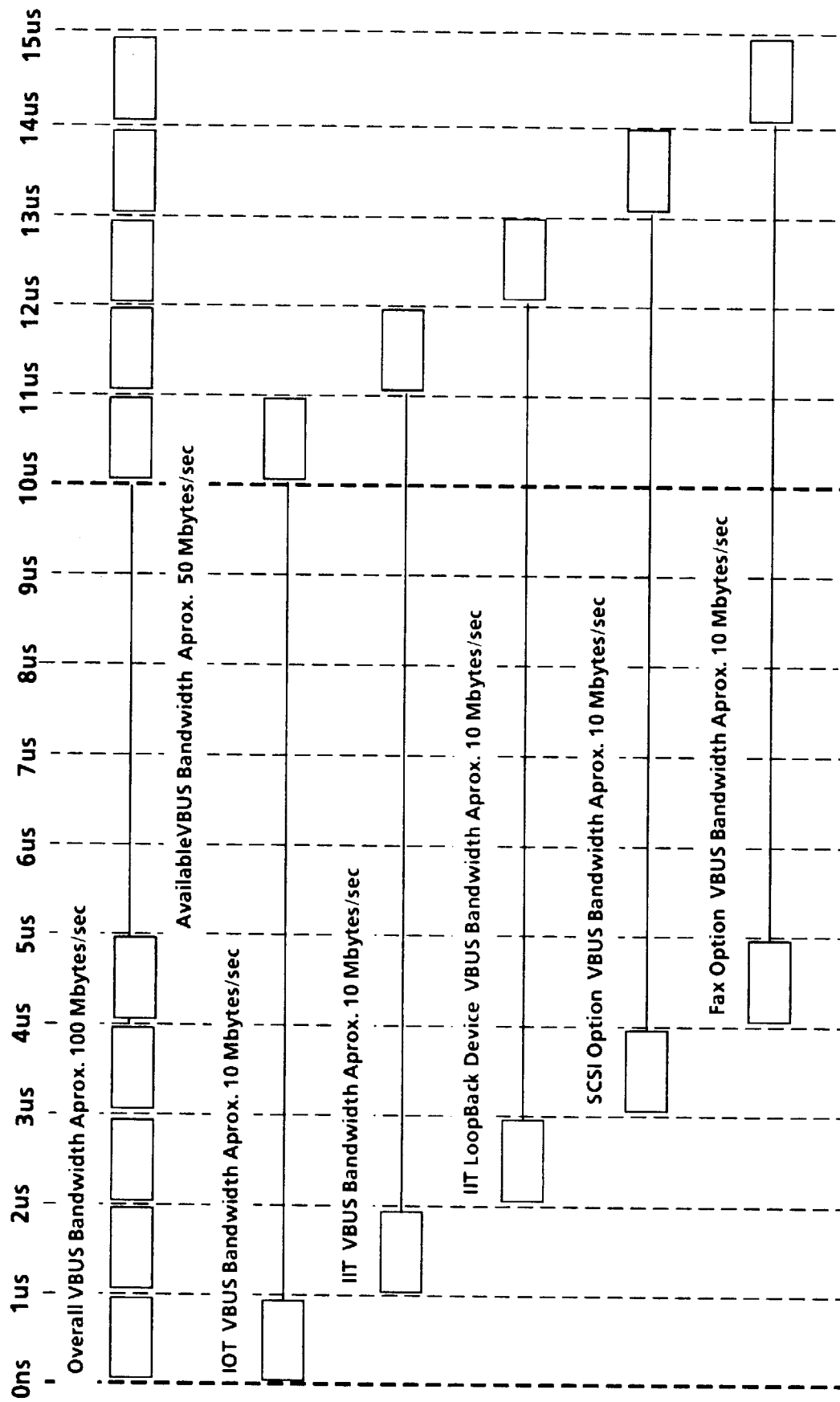
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbyteslsec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Referring to FIG. 9, the general concept underlying the annotate/merge device 66 (FIG. 2) is discussed in further detail. In the illustrated embodiment of FIG. 9, the annotate/ merge device 66 includes inputs 200a, 200b and output 202. Merge or annotation image 204 and scanned/imported (hereinafter referred to as "main image") 206, defined respectively by bitmaps (including pixels), are inputted in the form of bit streams. Preferably, the annotation image 204 is transmitted from the decompressor 64 (FIG. 2), by use of transport module 36d, while the main image is transmitted from either the scanner 18 or another suitable source, such as the network module 14. In the case where the merge image is transmitted from the network module, the corresponding bit stream is transferred to the annotate/merge device by way of transfer module 36e. As will be understood, the imported image could originate from another VCM source. Additionally, while the merge or annotation image is shown as being smaller than the main image, it contemplated that the annotation could be at least comparable in size to the main image. Finally, the merge item and the main image are merged on an output sheet 208. In one example, a border 209 surrounds the merge or annotation image.

In the preferred form of operation flow of the respective bit streams for the annotation image and the main image are coordinated, through employment of the transport modules 36 and the system controller 44. More particularly, the system controller initially programs the respective DMA interpreters of selected transfer modules so that the bit streams are delivered to the annotate/merge device in a timely manner. Further discussion of bit stream flow and control thereof follows below.

As will be appreciated by those skilled in the art, the merge image can be derived from various sources. In particular, for one example, a conventional scan/rescan operation, of the type available in Xerox' DocuTech® printing system, would be used to create the merge image. Other conventional techniques, such as an approach in which a merge image is created with a digitizing "wand", as disclosed in U.S. Pat. No. 4,956,667 to Gartner, would be suitable. Preferably, merge images are stored for use in system memory (e.g. EPC memory 24) or mass memory (e.g. SCSI disk 34). Details regarding the structure and operation of the annotate/merge device 66 follow below.

Figure 10:
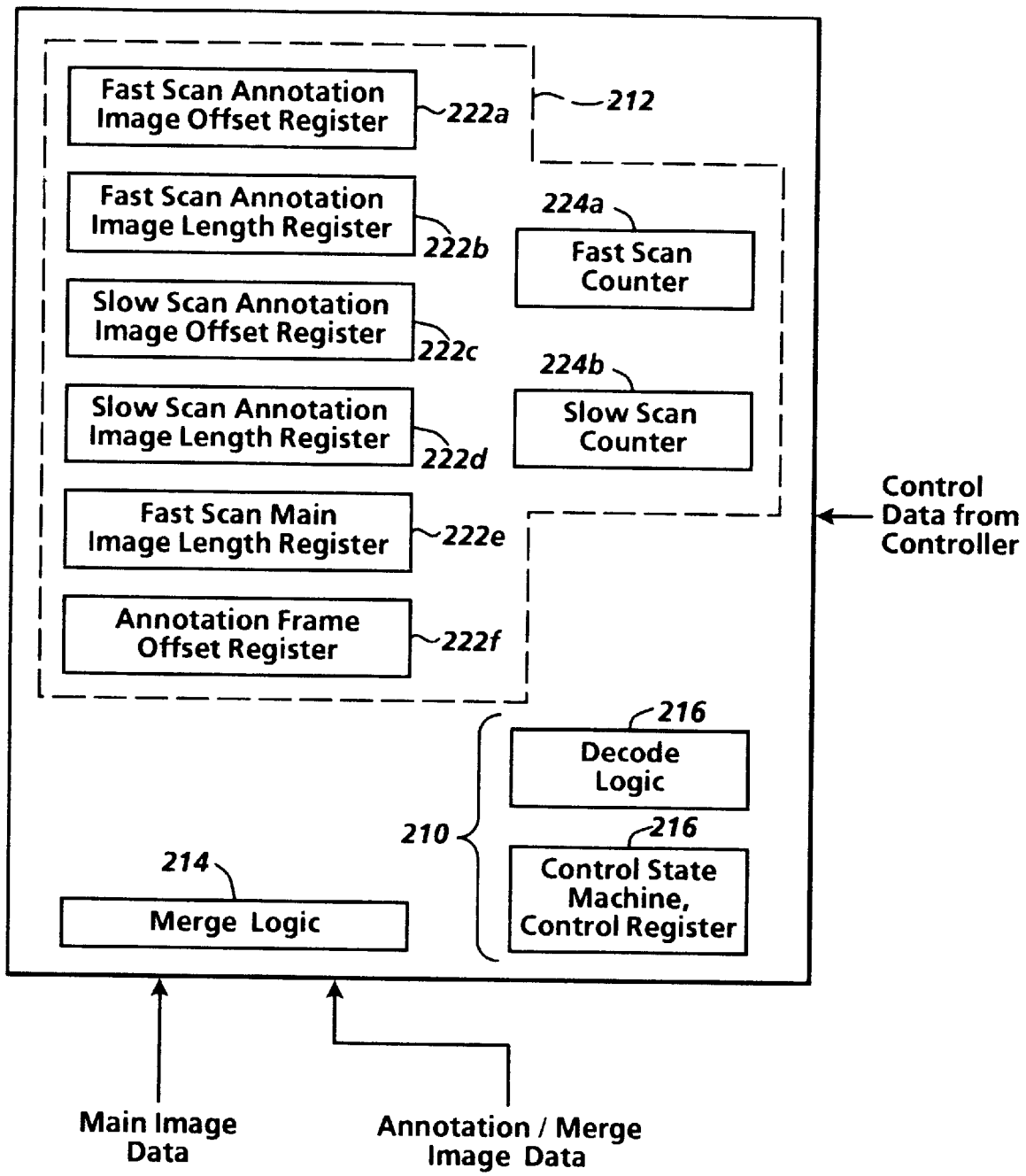
FIG. 10 is a block diagram representing an annotate/merge device of the present invention.

Referring to FIG. 10, the structure of the annotate/merge device 66 is shown in further detail. Essentially, the device 66 comprises device control section 210, merge image set section 212 and merge logic 214 Device control section 210 includes a logic decoder 216 and a control state machine/control register 218. Merge image set section includes registers 222a, 222b, 222c, 222d, 222e and 222f, as well as suitable pixel counters 224a, 224b. As will appear, annotation/merge functionality, as well as border development, is obtained by reference to the registers 222a–222f. The merge logic includes any suitable logic required to implement the truth tables shown below. Preferably, the merge logic is developed with the above-referenced VHDL. In practice, with VHDL, the logic for the below-referenced truth tables (Table 1 and Table 2) is designed in software and then simulated with logical hardware.

Figure 11:
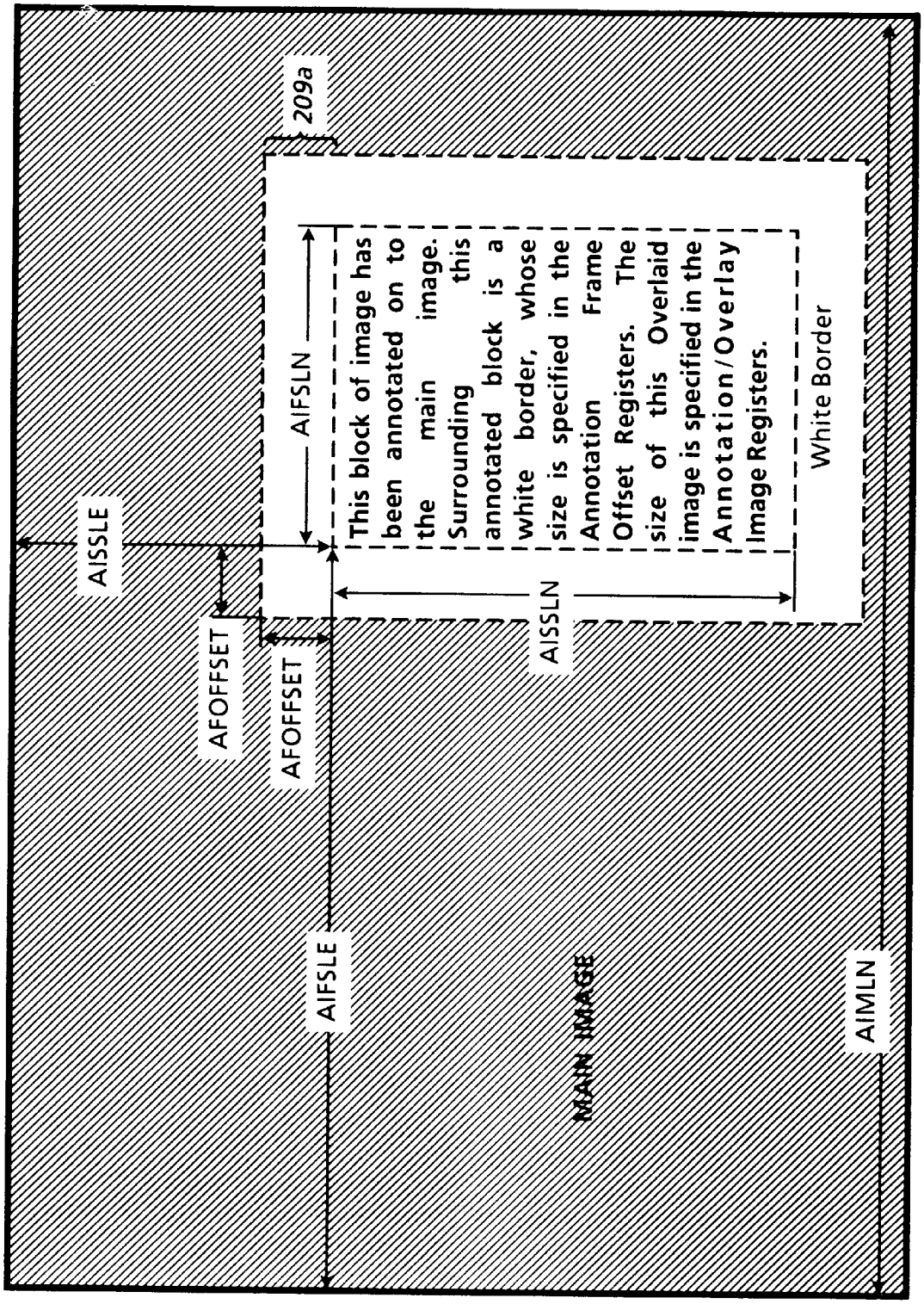
FIG. 11 is a schematic representation of both an annotated image and a border superposed with respect to a main image in accordance with an annotation technique of the present invention.

Referring specifically to device control section 210, the decode logic 216 serves to decode addresses for operation in the device registers while the control state machine/control register 218 controls device operation. In particular, the control state machine/control register, among other things, stores basic control information for use by the device 66, sets up device modes and manages communication necessary to maintain orderly control of the annotate/merge device. Preferably, the control register is loaded with the system controller 44. Additionally, the control section communicates with the transport modules 36 and the scanner 18 for transmitting control signals to at least one of the transfer modules, and/or the scanner, at appropriate moments. In one example, the control state machine/control register designates the moment at which the transfer module 36e should transport the bit stream for the annotation image to the annotate/merge device and the moment at which the scanner 18 should deliver the bit stream for the main image to the annotate/merge device Referring specifically to the merge image set section 212, the size and placement of the merge image is implemented through the programming of the registers 222. More particularly, the merge image is formed on a scanline-by scanline basis. To position the merge image, relative to the output page 208 (FIG. 9), the registers 222a, 222c are set to indicate image offset, relative to a given page edge, in the fast scan direction and the slow scan direction (referred to respectively as "AIFSLE" and "AISSLE" in FIG. 11). The registers can be set by one of several approaches. Preferably, the setting is achieved with a user (UI) interface 230 (FIG. 2), the user interface being coupled with the VBus 28 by way of a suitable UI interface 232. Any suitable UI, such as the UI used with the DocuTech® printing system, would be appropriate for use as UI 230. With a UI, such as the one used by the DocuTech®, the registers 222 could be set by way of keyboard input or a curser (e.g. "Mouse") technique. Registers 222b and 222d are used to designate dimensions of the merge image in the slow scan and fast scan directions. Referring to FIG. 11, the dimensions of the annotation image are referred to as AIFSLN and "AISSLN", respectively.

Preferably, the counters require information regarding main image length for generating synchronization signals with respect to each scanline. This information is stored in register 222e and the corresponding dimension is referred to, in FIG. 11, as AIMLN. Additionally, as will be discussed in further detail below, the border 209 is developed by reference to the information in each of the registers 222a–222e. More particularly, the width of the border is ascertained by reference to the offset "AFOFFSET", which offset is stored in the register 222f.

In the preferred embodiment, an annotation image can be superposed, relative to the main image so that the main image cannot be seen beneath the annotation image, or the annotation image can be superposed, relative to the main image so that the main image can be "seen through" the annotation image. In the latter case, the annotation image is referred to as an "overlay" image. In operation, the merge logic, during an appropriate time interval, processes various binary signals (or, in the case of color, gray signals), from the respective bit streams of the annotation image and main image, to superpose the annotation (or overlay) image relative to the main image. The merge logic is implemented with one of a variety approaches. In one example, the merge logic for the case of annotation (FIG. 11) is based on the following Table 1 while the merge logic for the case of overlay (FIG. 12) is based on the following Table 2:

TABLE 1

| Inputs | | |
|---|---|---|
| Main Image | Annotation Image | Output |
| X | 0 | 0 |
| X | 1 | 1 |

TABLE 2

| Inputs | | |
|---|---|---|
| Main Image | Annotation Image | Output |
| 0 | 0 | 0 |
| 0 | 1 | 1 |
| 1 | 0 | 1 |
| 1 | 1 | 1 |

As will be appreciated, if the present system were implemented in a color printing system, the truth table would accommodate for signals with more than two levels so that one or more pixels might be written in gray. [THIS SENTENCE GOES ABOVE WITH DISCUSSION OF TABLES]

Referring to FIG. 11, in view of the above description, an example of operation of the annotate/merge device 66 follows. Initially, the controller 44 sets up all components to be used for a given operation. This may include transmitting suitable control signals to selected ones of the scanner 18, transfer module 36c, transfer module 36d, transfer module 36f and the annotate/merge device 66. Then a mode is set with the control section 210 so that a selected one of annotation, overlay or signaturization is performed. In the example of FIG. 11, the annotation mode is set. Finally, the registers 222 are set to designate the placement and areal extent of the merge image. If desired, the register 222f is set to designate the placement and areal extent of the border 209.

Once the registers are set up, the flow of one or more bit streams is initiated. In particular, for the example of FIG. 11, a read signal is transmitted to scanner 18 so that a first scanline of a preselected main image is introduced to the annotate/merge device. Initially, (AISSLE−AFOFFSET) scanlines of the main image are written to an output or composite image with the counters 224. As will be appreciated by those skilled in the art, the writing is performed in a rasterized manner. The counters are able to determine the beginning and end of each scanline by reference to register 222e. Upon reaching the (AISSLE−AFOFFSET)th scanline, a portion of the border 209, having a length of (AIFSLN+2(AFOFFSET)), is written for AFOFFSET scanlines. As should be recognized, the counters examine the registers 222 periodically for determining the type of pixel to be written, to the composite image, at any given moment in time. In the case of border writing, pixels having a selected color (e.g. white) are written in place of the main image pixels.

Once the portion 209a of the border is written, a scanline, including the main image, the border and the annotated image, is produced. To produce such scanline, (AIFSLE−AFOFFSET) main image pixels and AFOFFSET border pixels are written. In the meantime, the control section 210 transmits a read signal, at an appropriate moment, to the DMA interpreter 40 of the transfer module 36d so that the annotated image is delivered to the merge logic 214, coincidentally with the main image, for processing in accordance with above-referenced Table 1. As soon as AIFSLN annotation image pixels are written, another AFOFFSET border pixels are laid down. The scanline is then completed with main image pixels. Each scanline, including main image, border and annotation image pixels is produced for AISSLN scanlines, and then the composite image is completed with a suitable number of main image/border and main image scanlines.

Figure 12:
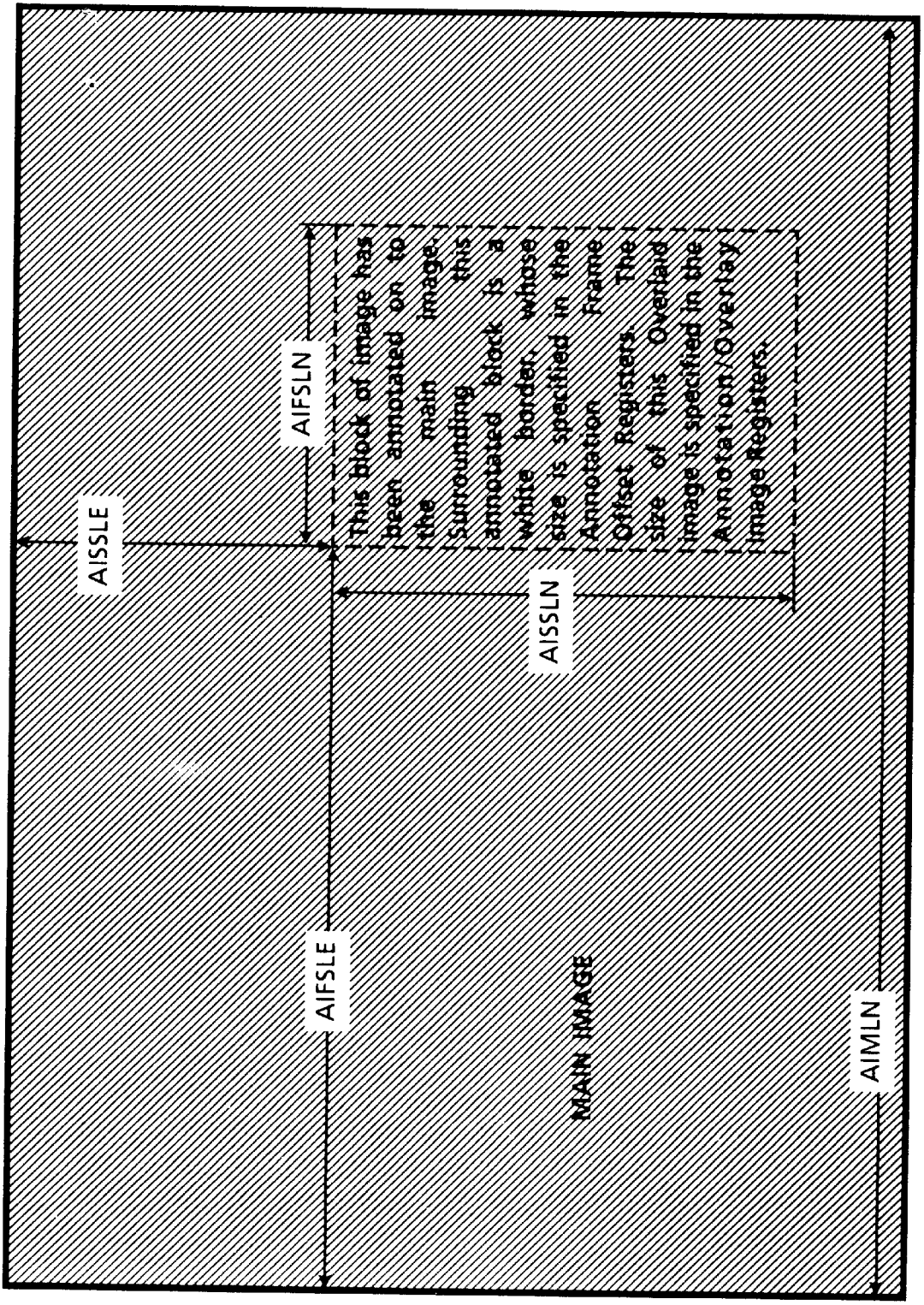
FIG. 12 is a schematic representation of an overlay image superposed with respect to a main image in accordance with the merge technique of the present invention.
Figure 13:
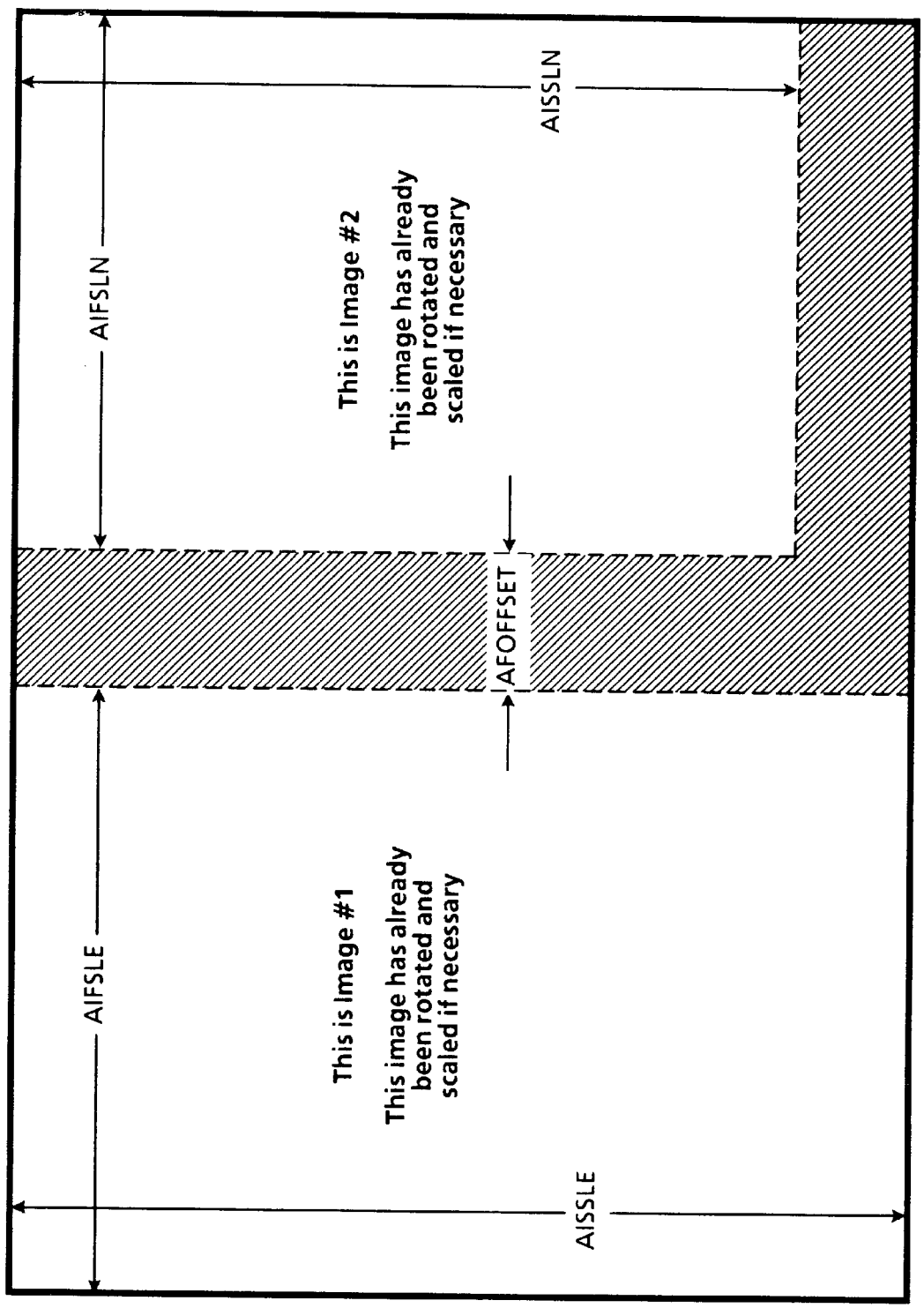
FIG. 13 is a schematic representation of a first image and a second image merged on a common substrate in "signature" form in accordance with the merge technique of the present invention.

Referring to FIG. 12, an example of an overlay process is illustrated. The overlay process is similar to the annotation process except that AFOFFSET=0, so that a border is absent, and the merge logic refers to above-referenced Table 2, rather than Table 1, in merging the annotation or merge image with the main image. Referring to FIG. 13, an example of a signaturization process is illustrated. The signaturization process differs from the annotation process in that the value of AIMLN is not employed and the registers 222a–222d and 222f are set in a manner which causes a gutter, having a magnitude of AFOFFSET, to be disposed between the main image and the annotation image. It will be noted that margins of each signature may be adjusted, at print time, by adding further offsets to the composite image of FIG. 13.

Further observations regarding the signaturization process are in order. First, when arranging a plurality of images into multiple electronic signature pages, "sorting" of the images is required. To achieve such sorting, a signature utility, of the type described in the above-mentioned General Information Manual of the Xerox Network Systems Architecture, may be employed. Second, for finishing several signature prints into a booklet, it would be advantageous to provide the printing system 10 with a signature booklet maker of the type disclosed in U.S. Pat. No. 5,184,185 to Rasmussen et al., the pertinent portions of which are incorporated herein by reference. Finally, each of the signature prints may be formed by way of the above-described technique or by way of a multiple pass system of the type described below.

Referring to FIGS. 14(A)–14(C), a technique for applying a plurality of merge items or labels to a common electronic substrate is illustrated. Referring to FIGS. 11 and 14(A), the image L1 represents an image applied to the substrate by use of the annotation process in which AIFSLE=AISSLE=AFOFFSET=0. To produce the image of FIG. 14(B), the annotation process is performed a second time, with a second image, and the values of the registers 222a–222d are adjusted so that the annotation image L2 is disposed immediately adjacent image L1. Essentially, the main image is passed through the annotate/merge device in order to annotate the second annotation image with the main image. Moreover, the main image typically serves as a background. Finally, it should be recognized that the image L2 can be similar to or different than the image L1. In one example of operation, it may be desirable to store the label list of FIG. 14(c) in mass memory (SCSI Hard Drive 34) for future use.

In order to form N images on the substrate, the main image is passed through the annotate/merge device N times and N images are superposed thereon. For the composite image of FIG. 14(C), the main image is passed through the annotate/merge device 15 times and 15 annotation images are superposed, relative to the main image, in accordance with 15 separate programs entered into the registers 222a–222d. As will be understood, during each pass, the value of AIMLN (FIG. 11) remains constant while the values of AIFSLE and AISSLE are varied in order to accommodate for desired annotation image position. While the values of AIFSLN and AISSLN for each annotation image in FIGS. 14(A)–14(C) remains constant, it is contemplated that these values could be adjusted on an annotation image by annotation image basis.

Figure 15:
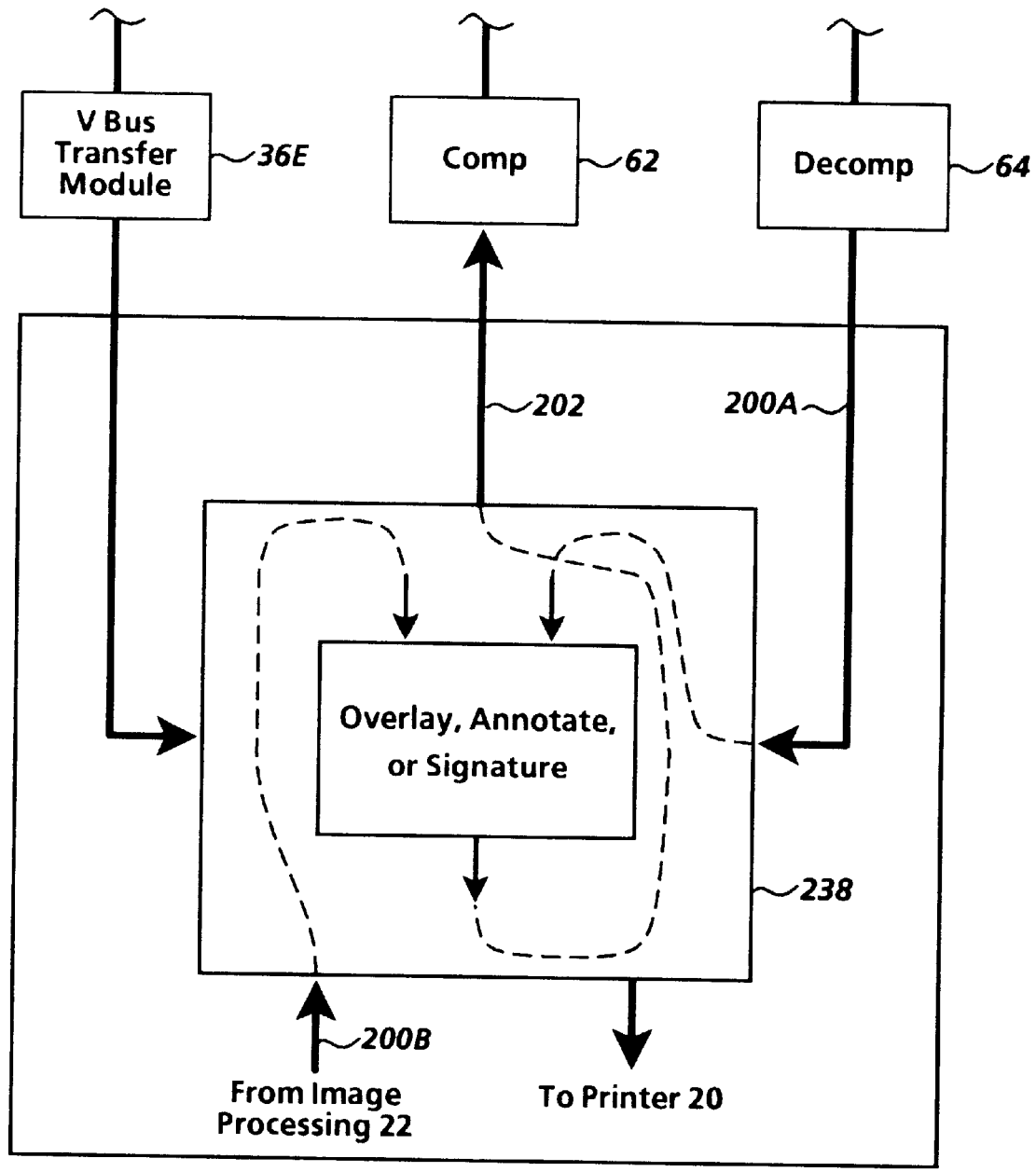
Figure 16:
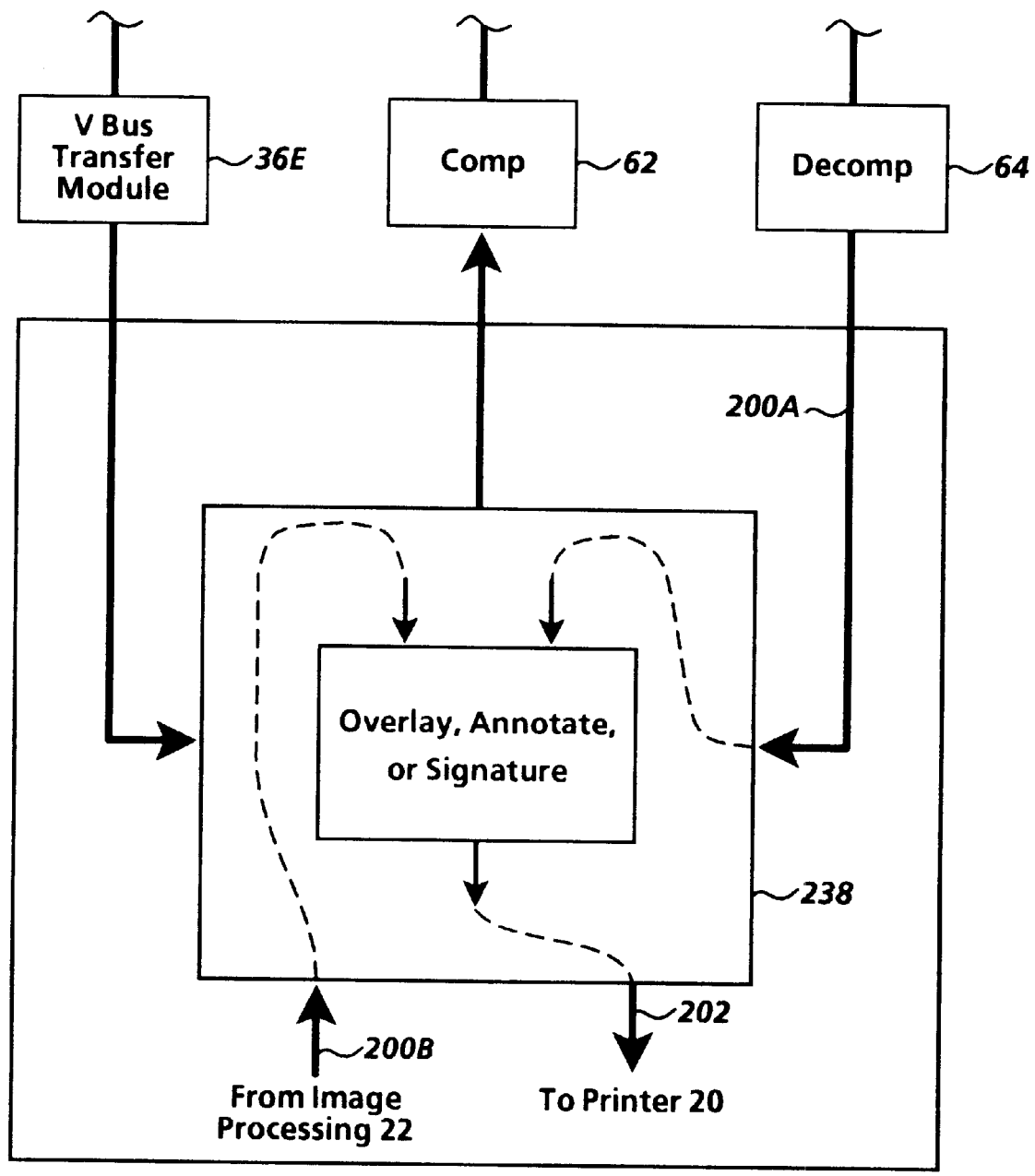
Figure 17:
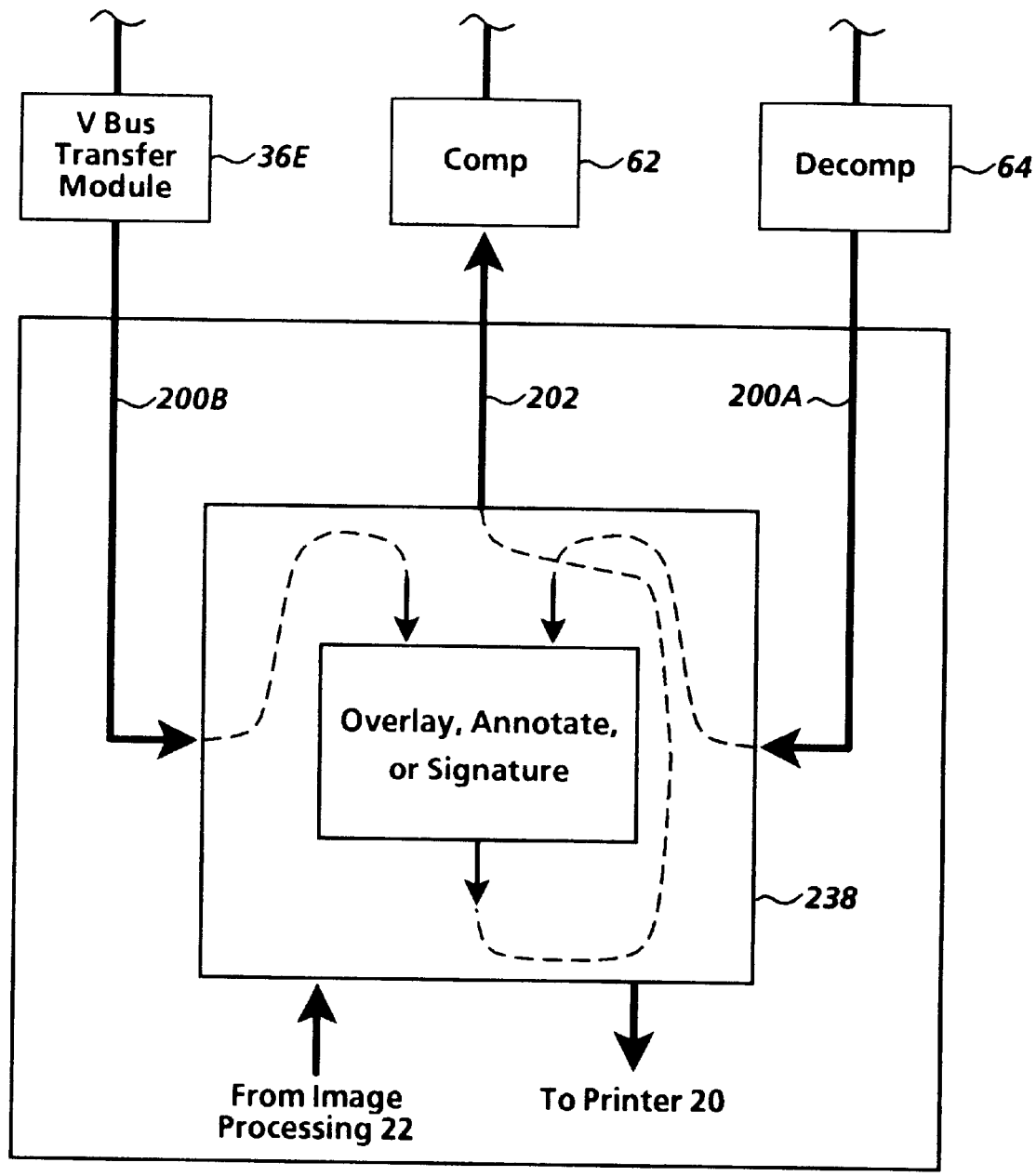
Figure 18:
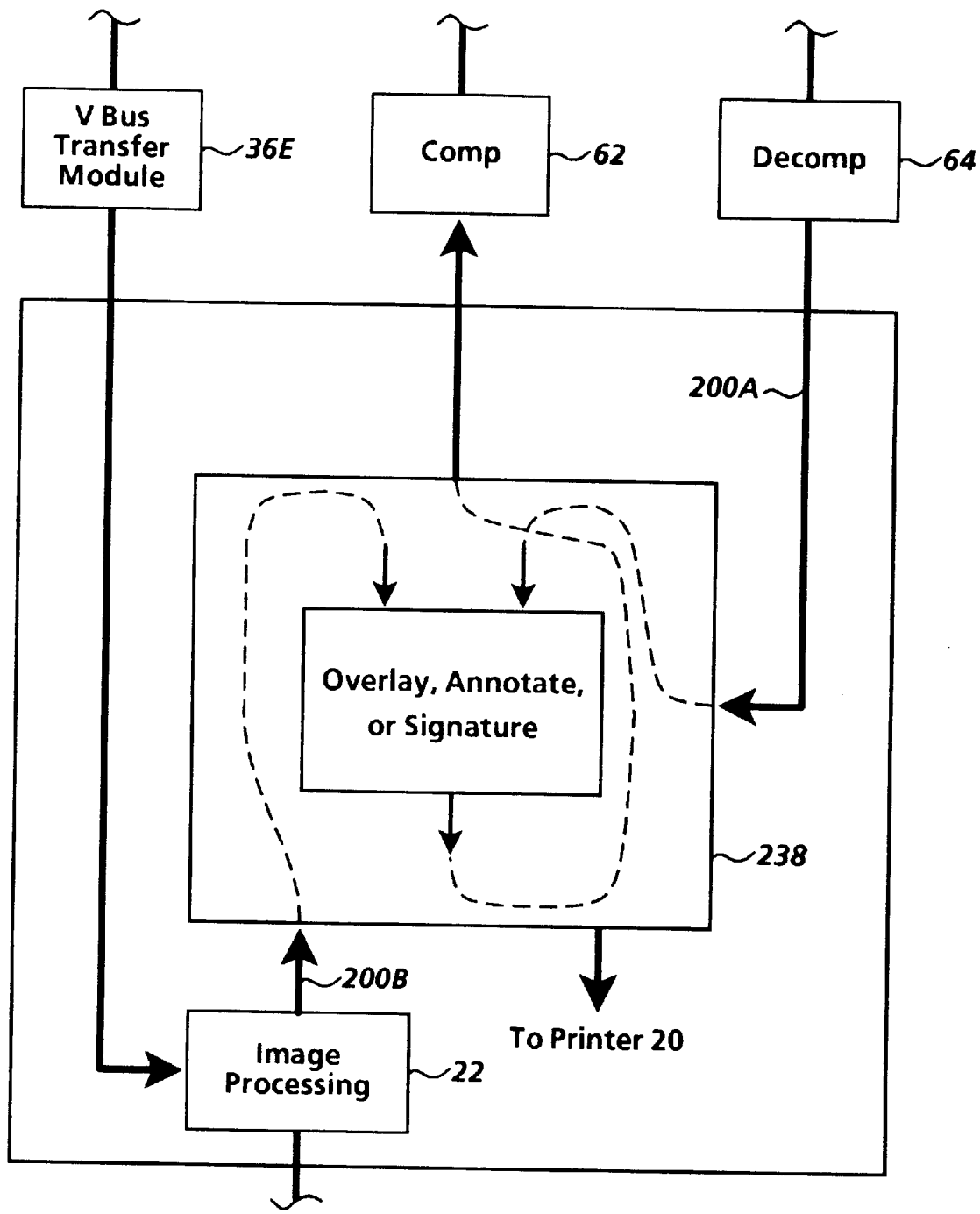

Referring to FIGS. 9 and 15–20, various exemplary modes of operation are shown. In a first example (FIG. 15), the first input page 204 is provided from, for example, EPC memory 24, by way of the transfer module 36d (FIG. 2) and decompressor 64, while the second input page 206 is provided from the scanner 18 by way of the image processing section 22. In turn, as shown in FIGS. 15 and 16, the composite image output of the first example can be either compressed and stored in memory or transmitted to the printer 20 for printing. It should be recognized that the annotate/merge device 66 is part of an ASIC 238 (FIGS. 15–20), the ASIC including a multiplexing device (not shown). Preferably, the multiplexing device permits image data transmitted through the decompressor to be selectively delivered to the annotate/merge device 66 and the printer 20.

In a second example (FIG. 17), the input page 206 has its origin in a source other than the VCM 12 such as the network module 14. In the second example, the input page 206 is a decomposed electronic page from the host memory 74 of the network module (FIG. 5). As will be appreciated, the annotation image 204 could have its origin in, for example, the host memory while the input page 206 could have its origin in the EPC memory 24. In an extension of the second example, the imported image is transmitted to the image processing section 22 (FIG. 18), where one or more image processing operations are performed on the imported image, and then to the annotate/merge device 66 by way of input line 200b. As with the first example, the output page 208 can be either compressed and stored in memory (FIG. 17) or transmitted to the printer 20 for printing (FIG. 19).

In a third example (FIG. 20), one of the input images 204, 206 is transmitted to line 200a while another one of the input images is transmitted to the line 200b. As with the first example, the output page 208 can be compressed and stored in memory (FIG. 20) or transmitted to the printer 20 for printing (not shown).

Numerous features of the disclosed embodiment will be appreciated by those skilled in the art: First, the annotate/merge device is a simple, centralized device that possesses a wide range of functionality. Since the device uses a minimum amount of hardware to perform multiple functions, in an efficient manner, the device is particularly cost-effective. In one example of operation, the device can alternate between annotation mode and overlay mode through simple adjustment of a single variable. In another example of operation, a border can be disposed about an annotation image to accentuate the same. Since much of the border development is accomplished through use of pre-existing annotation hardware, the border is provided at a minimum cost.

In yet another example of operation a quick and simple technique of developing signature bitmaps is provided. Signature bitmaps of this sort are portable and the corresponding signaturization technique permits simple booklets to be developed with a minimum amount of effort and expense. In yet another example of operation, the annotate/merge device is capable of placing multiple merge items or labels on a common substrate. In this way, label lists can be generated and stored for future use.

Second, the annotate/merge device fits advantageously into a multifunctional print machine context. In particular due to the arrangement of the annotate merge device, relative to both the video control module and the network service module, images from a wide range of sources can be processed with the device. For instance, local and imported images can be merged with one another readily. Accordingly, scanned images can be merged with network images. Additionally, the annotate/merge device is associated with a decompressor so that stored compressed image data can be inputted to the annotator/merge device in real time with scan or network image. Finally, in one exemplary implementation, the annotate/merge device is associated with multiple transfer modules. Accordingly, image data can be delivered to the device while image data is being transmitted from the device.

What is claimed is:

1. A printing system for merging a first image with a second image to produce a composite image, a copy of the composite image being reproducible on a print media sheet with a print engine, comprising a memory for storing the first image, the first image being represented by a first set of image data;

a first input source, communicating with said memory, for providing the first set of image data;

a second input source for providing a second image represented by a second set of image data;

a plural mode image manipulation subsystem communicating with both said first input source and said second input source, for receiving both the first set of image data and the second set of image data, said plural mode image manipulation subsystem electronically merging the first set of image data with the second set of image data to produce the composite image;

user programmable system for designating a positional relationship between the first image and the second image in the composite image, prior to introducing the first and second sets of image data to said plural mode image manipulation subsystem, said plural mode image manipulation subsystem, in response to user input to said user programmable system, being disposed in a selected one of a first mode and a second mode, wherein, in said first mode, the first image is superposed with respect to the second image and, in said second mode, the first image and the second image are arranged in a multiple-up format such that the first image and the second image are separated from one another by a gutter region; and said user programmable system including a positional value adjustment subsystem for controlling both the manner in which the first and second images are positioned in the composite image and the mode in which said plural mode image manipulation subsystem is disposed, wherein when a first set of positional values are provided to said user programmable system by way of said positional value adjustment subsystem, said plural mode image manipulation subsystem is disgosed in the first mode, and when a second set of positional values are provided to said user programmable system by way of said positional value adjustment subsystem, said plural mode image manipulation subsystem is disposed in the second mode.

2. The printing system of claim 1, in which said memory communicates with a network, wherein the first image is transmitted across the network to said memory.

3. The printing system of claim 1, further comprising a logical device for designating whether said plural mode image manipulation device is disposed In the first mode or the second mode.

4. The printing system of claim 1, in which the plural mode image manipulation subsystem is operated in the second mode, wherein a third image is disposed adjacent the second image to form a line of images in which the first, second and third images are disposed along a common axis.

5. The printing system of claim 1, wherein said second input source includes a scanner for reading a hard-copy page to provide at least a part of the second set of image data.

6. A method of merging a first image with a second image to produce a composite image, a copy of the composite image being reproducible on a print media sheet with a print engine, comprising storing the first image in a memory with the first image being in compressed form and represented by a first set of image data;

decompressing the first set of image data;

providing a second image represented by a second set of image data;

receiving both the decompressed first set of image data and the second set of image data at a plural mode image manipulation subsystem;

electronically merging the decompressed first set of image data with the second set of image data to produce the composite image;

employing a user programmable system for designating a positional relationship between the first image and the second image in the composite image, prior to introducing the first and second sets of image data to the plural mode image manipulation subsystem;

in response to user input to the user programmable system, disposing the plural mode image manipulation subsystem in a selected one of a first mode and a second mode, wherein, in said first mode, the first image is superposed with respect to the second image and, in said second mode, the first image and the second image are arranged in a multiple-up format such that the first image and the second image are separated from one another by a gutter region; and controlling both the manner in which the first and second images are positioned in the composite image and the mode in which the plural mode image manipulation subsystem is disposed by adjusting at least one positional value in a set of positional values so that the plural mode image manipulation subsystem is disposed in the first mode when the at least one positional value is set to a first magnitude and the plural mode image manipulation subsystem is disposed in the second mode when the at least one positional value is set to a second magnitude.

7. The method of claim 6, in which the memory communicates with a network, further comprising transmitting the first image across the network to the memory.

8. The method of claim 6, in which the plural mode image manipulation subsystem is operated in the second mode, further comprising disposing a third image adjacent the second image to form a line of images in which the first, second and third images are positioned along a common axis.

9. An plural mode image manipulation system for use with a printing system including a memory for storing a first image represented by a first set of image data, the memory communicating with a first input source, the first input source providing the first set of image data, the printing system further including a second input source for providing a second image represented by a second set of image data, the plural mode image manipulation system comprising:

a plural mode image manipulation subsystem communicating with both the first input source and the second input source, for receiving both the first set of image data and the second set of image data, the plural mode image manipulation subsystem electronically merging the first set of image data with the second set of image data to produce the composite image;

a user programmable system for designating a positional relationship between the first image and the second image in the composite image, prior to introducing the first and second sets of image data to said plural mode image manipulation subsystem, said plural mode image manipulation subsystem, in response to user input to said user programmable system, being disposed in a selected one of a first mode and a second mode, wherein, in said first mode, the first image is superposed with respect to the second image and, in said second mode, the first image and the second image are arranged in a multiple-up format such that the first image and the second image are separated from one another by a gutter region; and said user programmable system including a positional value adjustment subsystem for controlling both the manner in which the first and second images are positioned in the composite image and the mode in which said plural mode image manipulation subsystem is disposed, wherein when a first set of positional values are provided to said user programmable system by way of said positional value adjustment subsystem, said plural mode image manipulation subsystem is disposed in the first mode, and when a second set of positional values are provided to said user programmable system by way of said positional value adjustment subsystem, said plural mode image manipulation subsystem is disposed in the second mode.

* * * * *